DISTRIBUTIONAL AMPLIFIER MEANS
Filed Oct. 28, 1965 5 Sheets-Sheet 1
FIG. 1a.
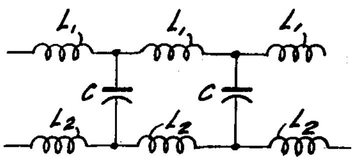
FIG. 1b.
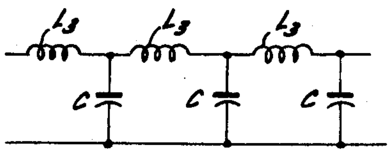
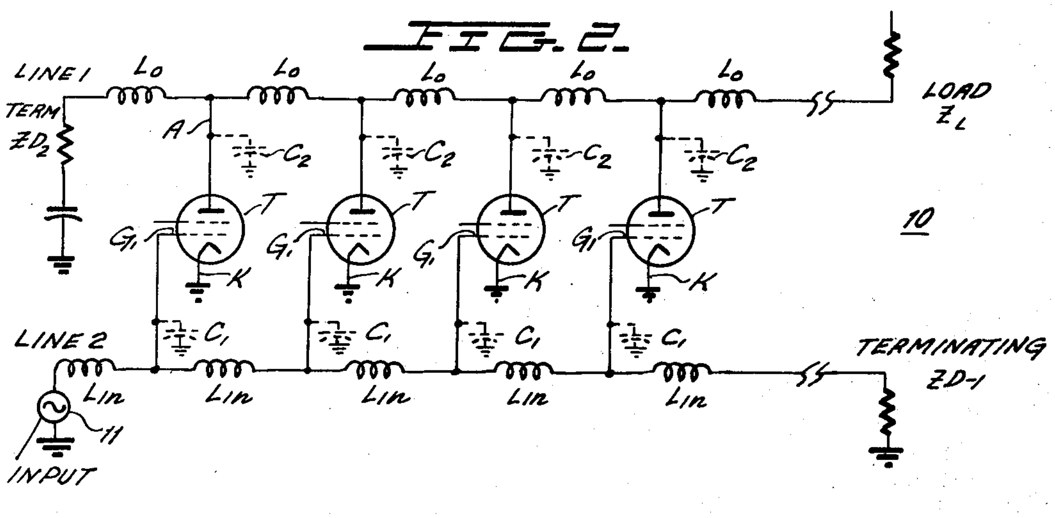
FIG. 2.
FIG. 4b. FIG. 4a.
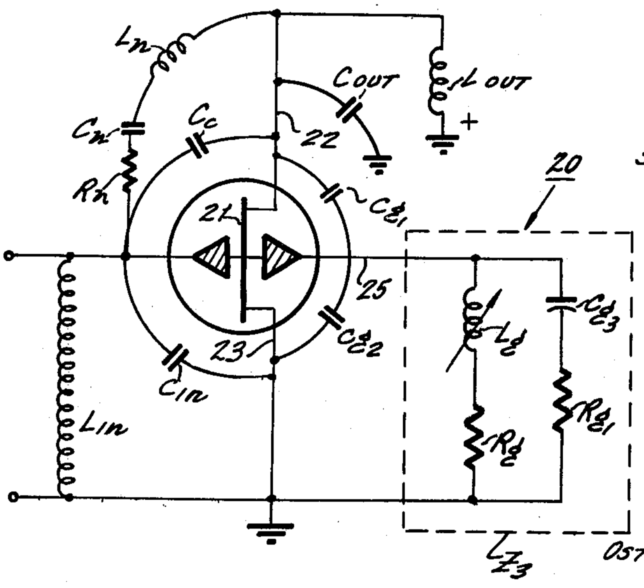
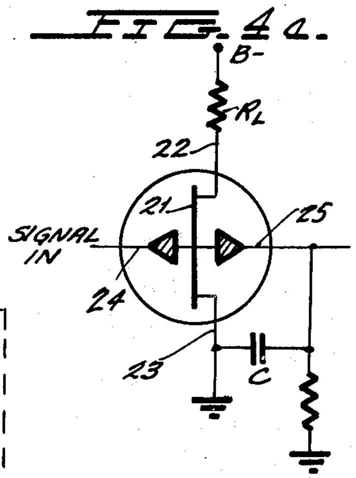
INVENTORS
GEORGE J. DOUNDOULAKIS
HAROLD R. WALKER
BY
OSTROLENK, FABER, GERB & SOFFEN
ATTORNEYS INVENTORS
GEORGE J. DOUNDOULAKIS
HAROLD R. WALKER
BY
Ostrolenk, Faber, Gerb & Soffen
ATTORNEYS

INVENTORS
GEORGE J. DOUNDOULAKIS
HAROLD R. WALKER
BY

OSTROLENK, FABER, GERB & SOFFEN
ATTORNEYS

INVENTORS
GEORGE J. DOUNDOULAKIS
HAROLD R. WALKER
BY
OSTROLENK, FABER, GERB & SOFFEN
ATTORNEYS

INVENTOR.
BY INVENTORS
GEORGE J. DOUNDOULAKIS
HAROLD R. WALKER
OSTROLENK, FABER, GERB & SOFFEN
ATTORNEYS

United States Patent Office 3,495,183

Patented Feb. 10, 1970

3,495,183

DISTRIBUTIONAL AMPLIFIER MEANS

George J. Doundoulakis, Greenvale, N.Y., and Harold R. Walker, Metuchen, N.J., assignors, by mesne assignments, to JFD Electronics Corporation, Brooklyn, N.Y., a corporation of Delaware Filed Oct. 28, 1965, Ser. No. 497,693

Int. Cl. H03f 3/60

U.S. Cl. 330—54 5 Claims

ABSTRACT OF THE DISCLOSURE

A distributed amplifier employing field effect transistors. In one embodiment, impedance means are coupled to the second gate of each field effect transistor to improve high frequency response. In order to balance the transistor capacitances, impedance elements whose impedance varies with the square of frequency, are coupled across the input and output terminals of the transistors to provide resonant tuned circuits thereacross to further improve high frequency response. This arrangement enables the lumped parameter transmission lines, normally employed in distributed amplifier circuits, to be replaced by discrete capacitor elements whose values may be chosen as low as possible to improve the gain of the amplifier. Automatic gain control circuits are employed for the purpose of utilizing a portion of the output power, which may otherwise be wasted, to provide a constant gain output. Neutralization circuits may be employed to prevent oscillation of the transistors at the high end of the frequency band. Their design and application is greatly simplified through the use of the tuned circuits.

The instant invention relates to high frequency transmission circuits and more particularly to novel circuitry employed in high frequency transmission lines and amplifier circuits for the purpose of providing significant improvements in impedance matching between input and output, significant increases in amplifier gain, maintaining of high input impedance for each amplifier, significant improvement in the circuit high frequency response and greatly simplified impedance matching between input and output circuits.

There exists numerous electronic systems in which it is desired to provide signal amplification of a substantially high gain over rather large bandwidths. In many cases there exists a wide variety of amplifier circuits which are suitable for providing these objectives. However, certain system applications require substantially high gain over bandwidths which extend into extremely high frequency ranges. One exemplary, but by no means exclusive example, exists in the community antenna television systems, commonly referred to as CATV systems. Such systems are typically comprised of a large antenna erected at an advantageous site and which is coupled through a cable to the system subscribers which may, for example, be located at substantial distances from the community antenna, which distances may be of the order of miles. Since the attenuation of the received signals is rather significant per unit mile of cable, it is important to provide these systems with amplifiers at spaced intervals along the cable feeding the signal from the community antenna to the system subscribers. Such amplifier circuits must provide gain of a suitable magnitude over a frequency band which extends over 250 megacycles at its upper limit. An amplifier which will yield the desired results for such an application is of a type commonly referred to as a distributed amplifier.

Distributed amplifiers are typically comprised of first and second lumped-element transmission lines which are commonly referred to as the input and output transmission lines. The first and second lumped-element transmission lines are designed so as to have substantially equal velocities of propogation. In the past, the input and output transmission lines have been coupled to one another through a plurality of pentode tubes wherein the interelectrode capacitances of the tubes are utilized as the capacitances of the transmission lines. The input signal to the distributed amplifier is coupled to one end of the input transmission line. The other end of the input transmission line is terminated in a characteristic impedance which is matched to the input transmission line to prevent reflections (i.e. standing waves). The control electrodes of the pentode tube grids are coupled at spaced intervals along the input transmission line, while the anode electrodes are coupled at spaced intervals along the output transmission line. As the signal travels down the input transmission line, it excites the various tubes. The output from these tubes propogate in both directions along the output transmission line. The input and output ends of the output transmission line are again terminated by impedances which match the characteristic impedance of the output transmission line. Now, however, one of these terminations becomes the load for the distributed amplifier. Since the output signals from each pentode tube arrive at the load in phase, they are added at the load end causing the gain of the distributed amplifiers circuit to increase linearly with the increased number of tubes employed in the circuit. Although the bandwidth narrows as additional stages are added, the narrowing of the bandwidth is slow enough so that a large number of stages may be satisfactorily combined. Such distributed amplifiers have the advantages of flat response and of being substantially failure proof due to circuit redundancy. This is due to the fact that if any amplifier tube fails, although the gain may be decreased due to the failure of one stage, the distributed amplifier circuit is still operative. Such features are also extremely advantageous for use in trunk lines employed in telephone networks.

To date, distributed amplifiers have been limited to the use of pentode tubes which have the characteristics of high input impedance and which require no neutralization. In the transistor art, a transistor device, commonly referred to as the field effect transistor, has been found to exhibit similar characteristics. However, field effect transistors cannot be substituted directly for tubes in a distributed amplifier because the field effect transistor (FET) is not a unilateral device and therefore tends to oscillate, especially at high frequencies. However, by neutralizing or unilateralizing, the field effect transistor, which has heretofore not been attempted with respect to distributed amplifiers, the substitution of field effect transistors for pentode tubes becomes highly advantageous.

Other considerations such as noise figure, transit time of the transistor and cross modulation distortion are of great importance in the high frequency broad band amplifiers. A device which offers favorable characteristics in all three respects, a special type of field effect transistor having its gate electrode insulated from the body of the semiconductor, is preferred in this embodiment. This type of field effect transistor is therefore commonly referred to as an insulated gate, field effect transistor (IGFET). The first gate electrode is connected to receive the input control signal, and the second gate electrode is commonly grounded. However, the second gate electrode may be employed for the purpose of controlling gain.

The IGFET exhibits the advantageous characteristics of small interelectrode capacities between all elements of the device, a short transit time between the drain electrodes, and low noise and cross modulation, all of which characteristics substantially reduce amplification difficulties at high frequencies. Amplification difficulties may be reduced still further by coupling a tuned circuit between the second gate electrode and ground, and tuning this circuit appropriately so that the voltage that appears across the second gate electrode can be made to lead the voltage across the first gate electrode by nearly 90°. This phase difference existing between the signals at the two gate electrodes acts to further reduce the transit time through the transistor causing the phase through the transistor to be made more linear with frequency yielding significantly improved high frequency response and greatly simplifying neutralization of the transistor.

As was previously described, both the input and output lumped-parameter transmission lines of the distributed amplifier are each terminated at one end thereof by the characteristic impedance in order to prevent reflections along the transmission lines. The many solid state amplifying circuits characteristic impedances are usually low in magnitude; such as, for example, transistor amplifiers, which are operating at high frequencies, have relatively low real input impedances. The characteristic impedances conventionally employed for the matching load consumes a predetermined amount of energy which is otherwise put to no advantageous use. The substitution of a solid state automatic gain control amplifier for the normally employed characteristic impedance at one end of the output transmission line serves the dual functions of impedance matching as well as utilizing the otherwise wasted energy absorbed by the characteristic impedance for the purpose of controlling the bias at the input electrode for each of the field effect transistors in the distributed amplifier circuit. The output of the gain solid state amplifier is passed through a suitable detector circuit to form a D.C. bias signal. This signal is coupled to the matched load of the input transmission line through suitable impedance means. In this manner, the normally wasted output energy absorbed by the dummy lead is employed to provide automatic gain control with the solid state amplifier of the automatic gain control circuit performing the added function of acting as the dummy load impedance.

The dummy load impedance, whether it be a solid state amplifier or of the conventional type well known to the art, is preferably purely resistive. This dummy load, in addition to absorbing half the power of feeding into the output transmission line may also reflect power toward the actual load at the opposite end of the transmission line if the dummy load and transmission line are mismatched, thereby setting up a standing wave pattern which is detrimental to the performance of the distributed amplifier. In addition, thereto, when a plurality of stages of distributed amplifiers are employed, interaction occurs between the stages which further reduces the performance of the circuitry.

Another problem which arises in the operation of the amplifier results from the fact that the characteristic impedance and propagation velocity of the input and output transmission lines are not purely a function of the transmission line capacitances and inductances, but are also a function of frequency. In the case of m-derived filter networks, the characteristic impedance changes appreciably in the region of the cutoff frequency for the distributed amplifier. Thus, while the amplified signals from each individual tube (or transistor) device of the circuit add in phase with the amplified signals for all other tube (or transistor) circuits, this phase relationship alters appreciably in the region of the cutoff frequency so that the signals are no longer in phase because of interactions with the reflected waves and the gain of the distributed amplifier suffers appreciably.

A circuit which overcomes the above disadvantages and yet provides the advantages of the conventional distributed amplifier circuit is comprised of a plurality of amplifier devices which preferably (but not exclusively) may employ field effect transistors. Separate inductance elements are coupled across the input and output terminals of each amplifier device forming a parallel resonant circuit converting the input and output impedances of each device in to pure resistance thereby greatly simplifying impedance matching in circuit applications.

Conventional tuned circuits are purely resistive (i.e., resonant) at only one frequency and are of no practical use in broad band amplifier circuits. The instant invention, however, employs inductive (transformer) devices having a ferrite core chosen for its permeability characteristic which varies inversely with frequency. In one preferred embodiment the permeability varies inversely with the square of the frequency.

The inductive device is coupled in parallel with the input capacity of the amplifying device (tube, transistor, etcetera) forming a parallel resonant circuit which is always in resonance and which has an impedance which is real (i.e., purely resistive). Use of such parallel circuits across both the input and output of the amplifier nullifies device capacity over the entire operating frequency range making the input and output impedances purely resistive.

Use of the resonant circuit design with amplifying devices having high real input impedances, such as pentodes and field effect transistors, makes impedance matching more difficult. However, by coupling such devices in parallel, the advantages of circuit redundancy and higher gain per stage are obtained in addition to lowering input and output impedances.

The input of each amplifying device is coupled in common to the signal source through transformer means. The outputs of the devices are likewise coupled in common to the load circuit transformer means. The circuit redundancy and linear relationship between gain and number of stages employed is quite similar to distribuated amplifiers except that the disadvantages of transmission line design and matching and half power loss in the matched dummy loads are not present in the parallel connected resonant circuit amplifiers of the instant invention.

The gain K of a circuit of the above design using field-effect transistors or pentodes is $K=nG_mR_1$ where $G_m$= device transconductance, $R_1$=load resistance and n= number parallel connected amplifier devices. In order to increase $G_m$ (thereby increasing gain K) the transistors (or tubes) may be connected in parallel with the resultant input and output impedance being converted to a purely resistive value by separate input and output resonant circuits thus greatly simplifying circuit design and substantially reducing the total number of circuit components required while providing high, flat gain over a broad frequency band.

The distributed capacitance of the circuit input and output matching transformers causes resonance at the upper frequency limits for the transformers. Frequency response is not flat, with peaking occurring in the region of resonance. Transformer frequency response is both flattened and broadened through the use of variable mu ($\mu$) cores of the type previously described thus further increasing overall circuit performance.

The neutralization techniques employed in amplifiers comprised of field effect transistors act to reduce gain in distributed amplifiers. Use of the variable inductive devices of the instant invention provide the additional feature of enabling the use of techniques which provide neutralization without a substantial loss in gain in addition to nullifying device input and output capacity.

Conventional distributed amplifiers utilize the input and output capacitances of the tubes (or transistors) as the shunt capacities of the input and output transmission lines, respectively. By utilizing filter sections with conventional capacitors in place of the tube input and output capacities this allows selection of as small a capacitance value as possible, providing input and output transmission lines having greatly increased values of characteristic impedance and hence greatly increased gain. However, the amplifying device must not offer any loading C. An object of the instant invention is to provide a device with the input and output C effectively cancelled. A plurality of resonant sections each comprised of the tube input capacitance and an inductor having a variable-mu core couples the higher voltage from the input transmission line to the tube (transistor) thus greatly improving gain.

Similar resonant sections, each employing the tube (transistor) output capacitance, couple the output of the tube (transistor) to the output transmission line. The circuit yields greatly improved gain and provides an excellent impedance match between the tube (transistor) and the input and output transmission lines.

It is therefore one object of the instant invention to provide a novel distributed amplifier circuit.

Another object of the instant invention is to provide a novel distributed amplifier circuit employing field effect transistors.

Still another object of the instant invention is to provide a novel distributed amplifier circuit employing field effect transistors of the insulated gate variety.

Another object of the instant invention is to provide a novel field effect transistor circuit for use in distributed amplifier circuitry and the like, employing an impedance network across the second gate electrode which is tuned so that its signal leads the phase of the input voltage signal leads the phase of the input voltage signal impressed upon the first gate electrode so as to improve the gain of the circuit and to improve its high frequency response.

Another object of the instant invention is to provide a novel distributed amplifier circuit employing an automatic gain control amplifier having a solid state amplifier as the dummy load for the output transmission line and including detector means coupled between the solid state amplifier and the input transmission line to provide automatic gain control for the amplifier circuit.

Another object of the instant invention is to provide a novel distributed amplifier circuit comprised of lumped parameter input and output transmission lines employing conventional shunt capacitors and including means for de-coupling the input and output capacities of the plural amplifying devices thereby increasing gain, simplifying impedance matching and reducing power loss.

Still another object of the instant invention is to provide a novel distributed amplifier circuit comprised of lumped parameter transmission lines having high characteristic impedances being coupled by a plurality of amplifying devices and employing novel inductive devices for nullifying the input and output capacities of the amplifying devices.

Another object of the instant invention is to provide a novel amplifier circuit comprised of a plurality of amplifying devices connected in parallel and including separate devices whose inductance values vary inversely with frequency for converting the circuit input and output impedance in to pure resistance over the entire operating frequency band.

Another object of the instant invention is to provide transformer means for impedance matching purposes employing a ferrite core having a permeability which varies inversely with the square of the frequency.

Still another object of the instant invention is to provide novel amplifier means employing inductive devices which perform the dual functions of reducing the device input and output impedance to pure resistance and forming a part of the neutralizing circuit of each amplifying device.

Still another object of the instant invention is to provide a novel impedance matching circuit for use in matching an input or an output circuit and being comprised of at least one impedance member having an inductance whose magnitude varies inversely with frequency so as to provide a substantially constant real impedance value over the entire frequency band.

Still another object of the instant invention is to provide a novel impedance matching circuit for use in matching an input or an output circuit and being comprised of at least one impedance member having an inductance whose magnitude varies inversely with the square of the frequency so as to provide a substantially constant real impedance value over the entire frequency band.

Another object of the instant invention is to provide a novel impedance matching circuit for use in matching an input to an output circuit and being comprised of at least one inductance member having a core whose permeability varies inversely with frequency so as to decrease the impedance of the inductance for increasing frequency over the operating frequency band.

Another object of the instant invention is to provide a novel distributed amplifier characterized by yielding linear amplification with low noise figure and low level of cross modulation over the operating frequency band.

Another object of the instant invention is to provide a distributed amplifier having high input impedance and output transmission lines coupled to amplifying devices through variable inductance impedance transforming sections.

Still another object of the instant invention is to provide a distributed amplifier in which conventional capacitors are substituted for the input and output capacities of the amplifying devices which have been nullified to yield greatly increased gain.

These and other objects of the instant invention will become apparent in reading the accompanying description and drawings in which:

FIGURES 1*a* and 1*b* are schematic diagrams showing the equivalent circuits for transmission lines such as coaxial cable of twin leads, which consist of an infinite number of inductances and capacitances distributed throughout their lengths.

FIGURE 2 is a schematic diagram of a conventional distributed amplifier.

FIGURES 3 and 3*a* are schematic diagrams showing distributed amplifier circuits employing some of the novel features of the instant invention.

FIGURE 3*b* is a schematic diagram showing an impedance transforming circuit designed in accordance with the principles of the instant invention.

FIGURE 3*c* is a plot showing the change in permeability versus frequency for the inductance member of the impedance matching circuit shown in FIGURE 3*b*.

FIGURE 4*a* is a schematic diagram of an insulated gate field effect transistor.

FIGURE 4*b* is a schematic diagram of a field effect transistor circuit incorporating the novel phase lead circuit of the instant invention.

Figure 9A:
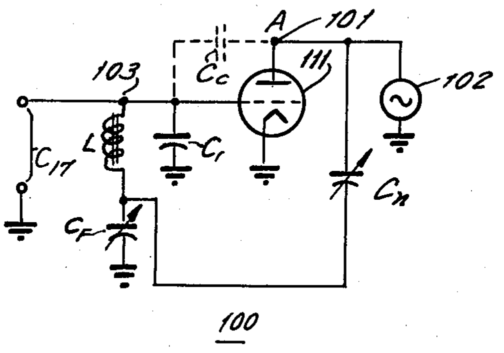
Figure 9B:
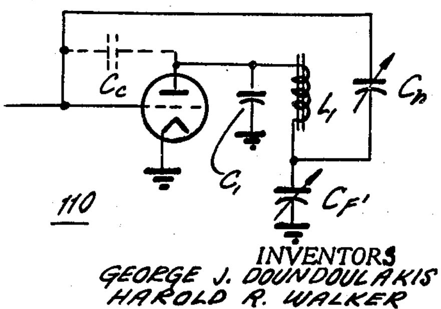

FIGURES 9*a* and 9*b* are schematic diagrams showing neutralization techniques for amplifying devices employing the novel impedance transforming means of the instant invention.

Referring now to the drawings FIGURES 1*a* and 1*b* are each schematic representations of a transmission line, namely twin lead and coaxial cable, respectively, either of which transmission lines may be considered to consist of an infinite number of inductances and capacitors distributed throughout the length of the line. In the case of twin lead, FIGURE 1*a* shows the equivalent representation which is comprised of first and second lines having distributed inductances, $L_1$ and $L_2$ respectively, which inductances are shunted at regular intervals by capacitors C. In the case of a coaxial cable only the upper line is comprised of distributed series connected inductances $L_3$. However, these lines are substantially equivalent to one another and may be designed to yield the same characteristics through proper selection of the inductance and capacitance parameters.

These transmission lines have a characteristic impedance which is given by the equation $$Z_0=\sqrt{\frac{L}{C}} \quad (1)$$

where C is a shunt capacitance, L is the equivalent series inductance for one section of the transmission line.

The propagation of a signal along a transmission line occurs at the phase velocity of the line given by $$V_{p,o}=\frac{1}{\sqrt{LC}}\text{ sections/seconds,} \quad (2)$$

L and C representing the same quantities as in Equation 1.

Turning to a consideration of FIGURE 2, there is shown a distributed amplifier 10 which employs a first or input transmission line comprised of a plurality of series connected lumped inductances $L_{in}$. The output transmission line is comprised of a plurality of lumped inductances $L_o$ which are likewise connected in series. It is assumed that the input and output transmission lines have equal phase velocities, but not necessarily equal characteristic impedances. The input and output transmission lines are coupled to one another through the vacuum tubes T which are preferably pentodes, wherein the control grid G1 of each tube T is coupled to an associated common terminal between adjacent inductances $L_{in}$. The anode terminals A of each tube are coupled to an associated common terminal between adjacent inductances $L_o$ of the output transmission line. The cathodes K of each of the pentodes T are grounded. In order to fully simulate a transmission line of the type shown in FIGURE 1*b*, the grid-to-cathode interelectrode capacitance $C_1$ of each tube T (shown in dotted fashion) is employed as the shunt capacitance for the input transmission line. In a like manner, the anode-to-cathode interelectrode capacitance $C_2$ (shown in dotted fashion) is employed as the shunt capacitance for the output transmission line. Input signal source 11 is coupled to one end of the input transmission line, the opposite end of which is terminated with a dummy load impedance $Z_{d1}$ such that $$Z_sZ_{d1}=Z_{o1}=\sqrt{\frac{L}{C}} \quad (3)$$

where $Z_s$ is equal to the internal impedance of the input source 11 and $Z_{d1}$ is equal to the impedance of the dummy load. If the relationship of the Equation 3 is maintained over the operating frequency band, the input transmission line will be perfectly matched, half of the energy in the line will be absorbed by the dummy load impedance $Z_{d1}$ and no reflection and hence no standing wave patterns will be generated in the input transmission line.

The output transmission line is likewise provided with a dummy load impedance $Z_{d2}$ coupled at one end thereof and with a load circuit $Z_1$ coupled at the opposite end thereof. In the case of the output transmission line $$Z_{d2}=Z_1=Z_{o2} \quad (4)$$

where $Z_{d2}$ is equal to the dummy load, impedance $Z_1$ is equal to the load circuit impedance and $Z_{o2}$ is equal to the output transmission line circuit and is perfectly matched. Half of the energy impressed upon the output circuit will be absorbed by the dummy load $Z_{d2}$ and no standing waves will be set up in the output transmission line.

In the distributed amplifier arrangement 10 of FIGURE 2 the signal from the input source 11 is applied to the grid $G_1$ of each tube in a successive fashion after predetermined phase delays. As can clearly be seen each lumped parameter transmission line section adds an additional increment of phase delay to a signal moving from the input source 11 toward the terminating impedance $Z_{d1}$. The amplified outputs of each tube T are coupled to an associated common point between the inductances $L_o$ and move in both the left-hand and right-hand directions along the output transmission line. All the signals traveling to the right are effectively kept in phase with one another due to the fact that the phase velocities of the input and output transmission lines are equal. Considering those amplified signals which move toward the right, these output signals, being in phase, are added to one another so as to produce a resultant output signal whose gain is:

$$A=\frac{V_{out}}{V_{in}}=\frac{nG_mR_{o2}}{2} \quad (5)$$

where $n$=number of tubes
$G_m$=tube transconductance
$R_{o2}$=line impedance (Eq. 1) $=Z_{o2}$ It is a basic property of the distributed amplifier that the entire circuit may have resultant gain even if an individual tube stage does not. Suppose that $$Z_{oz}=200\text{ ohms}$$
$$G_m=5{,}000\times10^{-6}$$

then an individual unit would have a gain of:

$$A=\frac{200\times5{,}000\times10^{-6}}{2}=.5$$

While the gain A represents a 50% loss for a single tube, if four such tubes are employed in a manner shown in FIGURE 1, the gain is 2 or 6 db.

It should be understood that the total number of tube stages employed in the distributed amplifier is dependent upon the system requirements for the particular application of the circuit. In most applications, especially in those of which the distributed amplifier is being employed for amplifying signals along a cable of a CATV system, the prime objective is to provide maximum gain, minimum bandwidth loss, low noise and low cross modulation. From a maxima-minima relationship which may be derived through use of calculus, such optimum system economy occurs when the distributed amplifier gain is about 9–10 db and when individual distributed amplifier units are cascaded to obtain the desired gain. In order to cascade distributed amplifier units, the load circuit $Z_l$ of FGURE 2 is removed and replaced by a second distributed amplifier which may be substantially similar to the amplifier 10 shown in FIGURE 1. Thus, the output end of the output transmission line of FIGURE 1 becomes the input source to a second distributed amplifier unit. The load circuit is then coupled to the output end of the transmission line of the second distributed amplifier unit (not shown). More such amplifier units may be cascaded if desired, and the number of tubes (transistors) employed within any given amplifier unit may be varied in order to achieve a desired gain in the range of 9–10 db.

For example, let it be assumed that a single distributed amplifier unit provides a gain of 1. Twenty such amplefier units can be connected in parallel to provide a gain of 26 db. However, nine amplifier units can provide a gain of 27 db if three amplifier units, each being comprised of three parallel tubes, are connected in cascade. It should be noted that no number of individual tube units connected solely in cascade would provide any gain at all, if each had a gain of 1. Due to the high feed-back capacity of the circuit, an amplifier with a gain of 26 db, which is unneutralized, would oscillate. With a gain of 10 db (i.e., approximately 3:1 gain in voltage) such an amplifier unit is stable.

Due to the inherent characteristics of solid state devices and especially of field effect transistors, it becomes extremely advantageous to substitute field effect transistors for the conventional pentode tubes in a distributed amplifier. The field effect transistor 20 is shown in schematic form in FIGURE 4*a* and is comprised of a semiconductor section 21 having a drain electrode 22 at one end thereof and a source electrode 23 at the opposite end thereof. The drain electrode is coupled through a load resistance $R_1$ to a suitable power supply. The source electrode 23 is grounded. The semi-conductor portion 21 commonly referred to as a channel is provided with first and second gate electrodes 24 and 25 at opposite sides thereof, each of which form separate PN junctions on opposite sides of the channel 21. For example, if the channel 21 is of P-type material, the electrodes 24 and 25 make contact with N-type impurities introduced at opposite sides of the P-type channel 21. By applying a reverse voltage to the gate-channel junction, conduction through the channel will be decreased due to the space-charged region set up. Thus, the transverse electric "field" introduced by the channel has an "effect" upon the channel conductance leading to the adoption of the term "field effect".

The first gate electrode 24 is commonly coupled to an input energy source, and the second gate electrode 25, which is preferably insulated from the first gate electrode, is grounded through a capacitance C.

The characteristic curves of the field effect transistor are quite similar to the characteristic curves of a pentode tube. For example, see the Text "Transistor Design" by the engineering staff of Texas Instruments Inc., copyrighted 1963 and published by McGraw Hill Co., pp. 497–523, showing field effect transistor curves and the R.C.A. "Receiving Tube Manual" showing characteristic curves for pentodes.

The gain of the field effect transistor is given by $$A=G_mR_1 \qquad (6)$$

where $G_m$ is the transconductance and $R_1$ is the load resistance. The field effect transistor requires no heater filament and no heater filament voltage, which characteristic is apparent amongst all transistors. The field effect transistor has a very high input impedance, low noise figure and low cross modulation. Otherwise, its characteristics are similar to a vacuum-triode as far as input capacity is concerned, and similar to a vacuum-pentode as far as its transfer characteristics are concerned. The transfer capacity (output to input) of a field effect transistor is relatively high and requires neutralization when employed in high gain circuits.

The input capacity for the field effect transistor is $$C_{in}=C_{gs}+K(1+C_{dg}) \qquad (7)$$

where

K=stage gain
$C_{gs}$=nominal input capacity
$C_{gd}$=feedback or transfer capacity In a typical FET device $$C_{gs}=4\text{ pf}$$
$$C_{gd}=.4\text{ pf}$$

Such a device becomes a tuned-plate tuned-grid oscillator quite readily. If the input impedance and gain are not properly controlled, such an oscillating amplifier is useless in distributed amplifier circuits. However, the choice of a field effect transistor for use in distributed amplifiers is nevertheless advantageous since it is a very low noise device and yields very low cross-talk.

Figure 3:
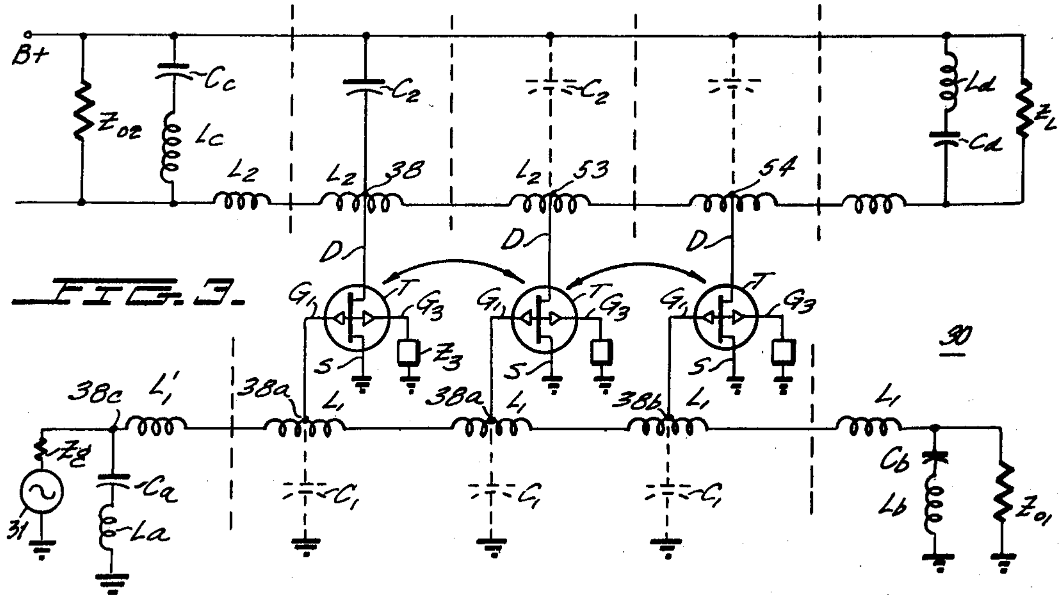

FIGURE 3 is a schematic diagram of a distributed amplifier circuit embodying the principles of the instant invention.

The distributed amplifier circuit 30 of FIGURE 3 is comprised of an input transmission line having series-connected inductances $L_1$. The amplifier circuit 30 is fed by a source generator 31 having an internal impedance $Z_g$. The dummy load for the input transmission line is $Z_{o1}$. Input and output impedance matching circuits (i.e., filter half-sections) are provided and are comprised of shunt branches of series-connected elements $C_a$–$L_a$ and $C_b$–$L_b$ and series inductances $L_1$ for matching the source 11 to the input line and the load $Z_1$ to the output line. The distributed amplifier 30 employs three field effect transistors T, each of which has its first gate electrode $G_1$ electrically coupled at points intermediate the end terminals of conductances $L_1$. The second gate electrode of each transistor $G_2$ is coupled to ground through an impedance circuit $Z_3$ to be described in greater detail. The gate-to-ground capacitance of each transistor T is utilized as the shunt impedance for the input transmission line and is represented by the capacitance $C_1$.

The output transmission line is comprised of series-connected inductances $L_2$. The output transmission line is terminated at one end by a dummy load impedance $Z_{o2}$ and at the opposite end by the load circuit $Z_1$. The impedance matching circuits (filter half-sections) $C_c$, $L_c$, $L_2'$ and $C_d$, $L_d$, $L_2'$, are provided at opposite ends of the output transmission line. The drain electrode D of each of the field effect transistors T is coupled to an associated inductance $L_2$ at a point intermediate its end terminals. The drain-to-ground capacitance of each transistor T is utilized as the shunt capacitance for the output transmission line and is represented schematically by the capacitances $C_2$.

The input and output transmission lines are each comprised of a plurality of lumped parameter $\pi$ filter sections which may be filter sections of either the constant K or m-derived type.

The manner of obtaining the parameters for each component are well known in the art. A detailed description of the manner of deriving such networks is set forth in the Text entitled "General Network Analysis" by LePage and Seeley, copyright 1952, published by McGraw Hill Book Company. The design of constant K and m-derived filters is discussed on pages 223–232. Lumped-parameter transmission lines comprised of such filter sections are employed in lieu of the artificial transmission lines of the types shown in FIGURES 1*a* and 1*b* due to the fact that the shunt capacities in the transmission lines of the type shown in FIGURES 1*a* and 1*b* are integral, non-divisible components which are evenly distributed along the length of the transmission lines and therefore cannot be removed and substituted by the input and output capacities of the amplifying devices. Since only small shunt capacities can be tolerated before a lumped parameter transmission line reaches cut-off at high frequencies (as will be more fully described) it is desirable that no shunt capacities be contributed by the amplifying devices. Means for accomplishing this will be discussed later.

M-derived filter sections are preferred rather than K-type filter sections because the m-derived type filters present a more uniform characteristic impedance up to about 80% of the cutoff frequency while K-type filters vary considerably more throughout the frequency band. Another paper which discusses determination of parameter values is entitled "Distributed Amplifiers" by B. Murphy, appearing in the February 1953 issue of Wireless Engineer.

Suitable values of M for the filter sections of FIGURE 3 is given in the figure. In the circuit of FIGURE 3, the gain was held to about 10 db. For this level of gain the circuit response was found to be flat from 0–250 megacycles. Also, under certain conditions with this gain, the unit was found to be stable and the field effect transistors were found to be stable up to a gain of 18 db. without a need for employing neutralization techniques.

The impedance circuit $Z_3$ of FIGURE 3 is shown in greater detail in FIGURE 4*b*. The field effect transistor 20 of FIGURE 4*b* has interelectrode capacity between all elements as represented by the capacitances $C_{g1}$, $C_{g2}$, $C_o$ and $C_{in}$. These interelectrode capacitances, together with the transit time required for the charged particles to move from the source electrode 23 to the drain electrode 22, all contribute to amplification difficulties at high frequencies. In the case where the field effect transistor is operated near the high end of the frequency band, or those frequencies where oscillation will occur, a neutralization circuit comprised of series-connected components $L_n$, $C_n$ and $R_n$ may be employed to neutralize or unilateralize the device through this feed-back network.

In addition to the employment of neutralization techniques, the input and output circuits of the transistor may be compensated to remove any capacitive effects by means of inductances to correct for the input and output capacitances of the circuit. Such compensating elements are represented by the components $L_{in}$ and $L_{out}$ which are unique frequency variant devices to be discussed later.

In field effect transistors, the transit time for charged particles moving from the source to drain electrode becomes of greater significance for frequencies near the high end of the operating band, causing the input impedance of the transistor to decrease with increasing frequency. In order to reduce the effect of transit time upon circuit operation, the tuned circuit $Z_3$ comprised of the elements $L_g$, $C_{g3}$ and $R_g$ and $R_{g1}$, is coupled between ground potential and the second gate electrode 25. The $L_g$ and $C_{g3}$ elements are adjusted to resonate, by the input and output circuits, at a different phase with respect to the signal at the first gate electrode. This phase relationship is made variable through the tuning operation. By appropriate tuning, the voltage at the second gate electrode 25 can be made to lead the voltage at the first gate electrode 24 by nearly 90° so as to cause charged particles to be urged toward the drain electrode from the source electrode prior to the time that the first gate signal reaches the appropriate magnitude and phase to draw charged particles from the source toward the drain electrode. The tuned circuit raises the input impedance of the transistor as well as making the phase shift through the transistor more linear with frequency so that high frequency response is significantly improved and neutralization techniques (when needed) are easier to accomplish.

Considering the operation of the distributed amplifier 30 of FIGURE 3, the input signal from generator source 31 is impressed upon the input transmission line with the signal moving from the left toward the right at a phase velocity established by the series and shunt impedance values of the input transmission line. These signals are coupled to the first gate electrodes of each field effect transistor causing an amplified output signal to be generated at the drain electrode of each transistor. The output signals of each drain electrode will be out of phase with one another by an amount equal to the phase velocity times the number of filter sections between each drain electrode. The dummy load impedance $Z_{01}$ is selected so as to prevent any standing waves from being set up in the input transmission line.

Considering the left-hand most transistor T, the amplified output signal appearing at its drain electrode will move simultaneously toward the right and toward the left along the output transmission line. The signal, in moving toward the right, will arrive at the drain electrode for the middle field effect transistor T exactly in phase with the amplified output signal generated by the middle transistor. In a like manner, all the generator output signals moving toward the right are in phase and will add linearly at the load circuit $Z_1$. The impedance of the dummy load $Z_{02}$ is selected so as to prevent any standing wave patterns to be set up within the output transmission line.

Assuming perfect impedance matching in the output transmission line circuit, half of the energy in the circuit will be absorbed by the dummy load $Z_{02}$. Thus, half the energy is effectively wasted. In order to put some of this wasted energy to better use, the dummy load impedance $Z_{02}$ may be replaced by the solid state amplifier circuit 32 (see FIGURE 3*a*) which has an input impedance substantially equal to the impedance of the conventional dummy load impedance normally employed. The output of solid state amplifier 32 is impressed upon a detector circuit 33 to convert the amplified output signal into a D.C. signal.

The rectified output signal from detector 33 is then impressed upon the dummy load end of the input transmission line circuit through a resistance element $R_1$, preferably of large value, so as to control the gate bias and hence the gain of the field effect transistors T. The dummy load impedances are usually of the order of 270 ohms for the input transmission line and 800 ohms for the output transmission line. The solid state amplifier circuit 30 is preferably comprised of a solid state device which, at high frequency operation, has a low real input impedance. With the amplifier taking the place of the dummy load impedance $X_{02}$, the line is properly terminated and yet this energy which is normally wasted in the conventional dummy load impedance is now employed to control gate bias for the transistors T.

It should be noted that if any one of these field effect transistors fails during operation, the distributed amplifier circuit will not fail. Since all of the amplified output signals of each transistor T add in phase at the load circuit, the failure of one of these transistors would simply reduce the gain of the circuit by about 3–4 db. By designing excess gain into the distributed amplifier circuit the automatic gain control circuit comprised of amplifier 32 and detector 33 will operate to instantaneously raise the overall gain in order to compensate for the failure or loss of one of the transistors in the amplifier circuit.

As was previously described it is conventional to employ tube (or transistor) input and output capacity as the shunt capacitances for the input and output lumped parameter transmission lines respectively, of the distributed amplifier circuit.

As was previously described with respect to FIGURE 3, the amplified output signals at the drain electrodes D of each field effect transistor T move both toward the left and right-hand ends of the output transmission line. Since the phase velocities of these filter sections are equal, all of these signals will add at the load circuit $Z_1$. At operating frequencies near the upper end of the frequency band, the characteristic impedance and the phase velocity values alter to a significant degree causing reflected signals which are out-of-phase with the forward signals, resulting in attenuation of the output signal. Such harmful effects have been found to occur in distributed amplifiers of the type shown in FIGURES 2 and 3, which are comprised of input and output transmission lines made up of a plurality of series connected filter sections.

The input transmission line serves to couple the signal from the generator source 31 to the matched load where half the input power is absorbed. The control electrodes are connected along the input transmission line at the points where the shunt capacitances are required.

The output transmission line is similarly designed with the output points of the amplifying transistors being coupled at the associated points where the shunt capacitances are required.

The disadvantages of the output transmission line in conventional distributed amplifiers are:

(1) Half the power fed into the output transmission line is absorbed by the dummy load impedance and if the dummy load impedance is mismatched with respect to the output transmission line, power is reflected toward the load circuit $Z_1$ setting up a standing wave pattern which is detrimental to the performance of the circuit.

(2) Interaction occurs between the transistor stages.

Figure 6:
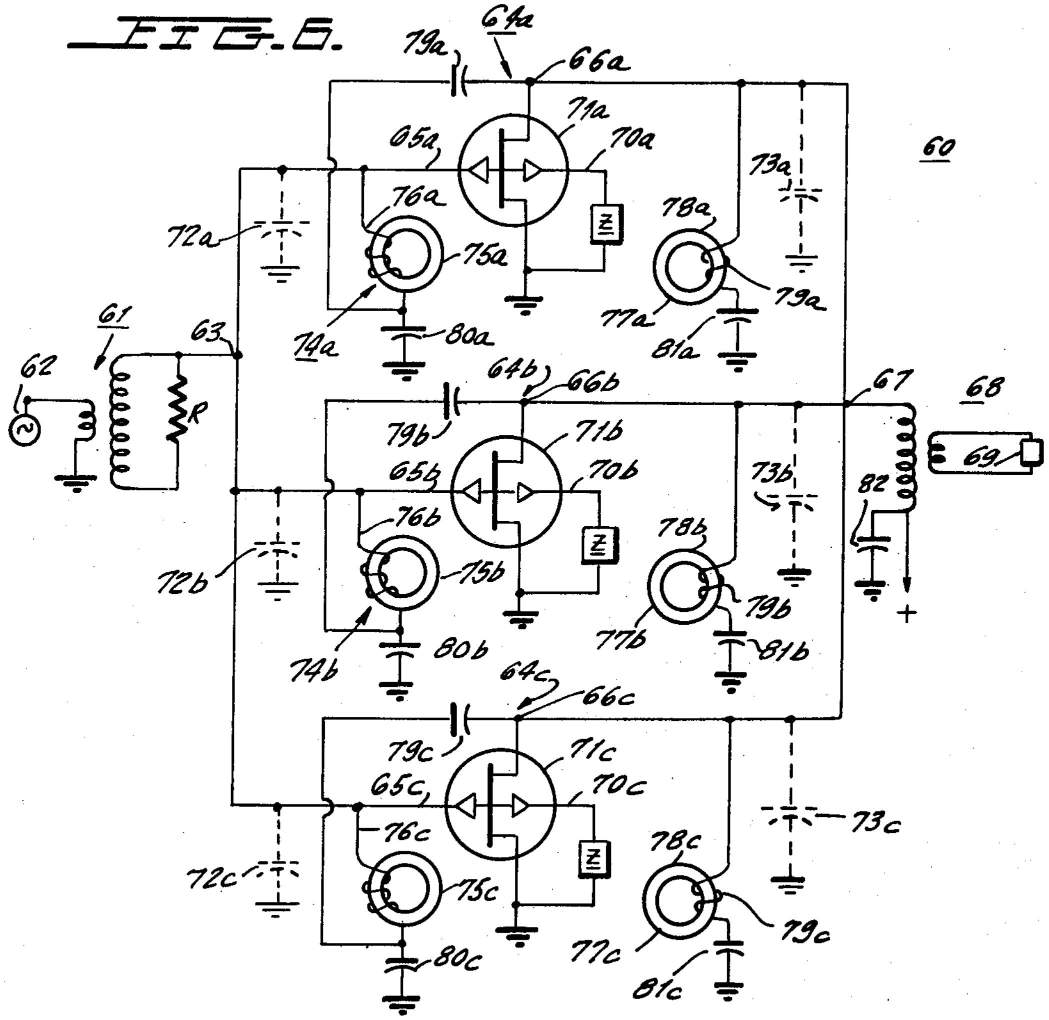
FIGURES 6 and 7 are schematic drawings showing alternative amplifier circuit designs employing the novel impedance transforming elements.

A circuit which overcomes the disadvantages of the above described distributed amplifier is shown in FIGURE 6 and is designated generally by the numeral 60. The amplifier circuit 60 of FIGURE 6 is comprised of an input transformer 61 whose primary is coupled to an input signal source 62. A resistor R is connected across the output terminals of the secondary of transformer 61 for the purpose of properly terminating the input line and to despoil the Q of the parallel resonant circuits to be more fully described. One output terminal of the secondary of the transformer 61 is grounded and the other output terminal 63 is connected in common to the first gate input 65*a*–65*c* of the field effect transistors 64*a*–64*c*, respectively. The drain electrode terminals 66*a*–66*c* respectively, are connected in common with the output terminal 67 which, in turn, is coupled to the primary of transformer 68. The secondary of transformer 68 is coupled to the output or load circuit 69.

Each of the second gate electrodes 70*a*–70*c* are coupled through impedance circuits Z to ground potential. The source electrodes 71*a*–71*c* are likewise grounded. The input capacity for each field effect transistor is designated by the dotted line capacitors 72*a*–72*c*. The output capacity for each of the field effect transistors is designated by the dotted line capacitors 73*a*–73*c*, respectively.

The input capacities are nullified by coupling an inductive element 74*a*–74*c* in parallel with each of the input capacities 72*a*–72*c*, respectively. Since all of the inductive devices 74*a*–74*c* respectively, are substantially identical, only one of these devices will be described at this time for purposes of simplicity.

The inductive device 74*a* is comprised of a ferrite core 75*a* having a permeability characteristic which varies inversely with the square of the frequency in the same manner as was previously described. The core 75*a* is provided with a winding (i.e., inductor) 76*a* of a predetermined number of windings. The inductive device 74*a* is designed to have an inductance which is valued so as to form a resonant circuit with the input capacity 72*a* so that the parallel tuned circuit comprised of these elements is always in resonance throughout the entire operating frequency band. For example, when the circuit 60 of FIGURE 6 is employed as a CATV amplifier circuit the resonant circuit is designed to be resonant over the frequency band from approximately 50 megacycles to approximately 260 megacycles. It is well known that a resonant circuit is purely resistive at the resonant frequency so that the novel resonant circuit of the instant invention transforms the input impedance of each transistor device 64*a*–64*c* into pure resistance thereby greatly simplifying impedance matching between the amplifier circuit 60 and the input and output circuits 62 and 69, respectively.

The same arrangement is provided for the output circuit of each field effect transistor such that an inductor device 77*a*–77*c* is coupled in parallel with each of the output capacities 73*a*–73*c*, respectively, to form a second resonant circuit. Each of the inductive devices such as, for example, the inductive device 77*a* is comprised of a ferrite core 78*a* whose permeability varies inversely with the square of the frequency. A coil 79*a* of a predetermined number of windings is wound about the core 78*a* with the number of turns selected so as to form a parallel resonant circuit with the output capacity 73*a*. Since the variable $M\mu$. core changes its permeability inversely as the square of the frequency the output parallel resonant circuit is purely resistive over the entire operating frequency band thereby transforming the output impedance of each of the field effect transistors 64*a*–64*c* in to pure resistance.

The inductance 74*a*–77*a* through 74*c*–77*c*, respectively, nullify transistor capacity which occurs in the neutralization circuitry for each of the field effect transistors.

Through the use of a plurality of transistor amplifier devices 64*a*–64*c*, in the manner shown in FIGURE 6, circuit redundancy is obtained. This feature is similar to distributed amplifiers in that the failure of any one of the transistors 64*a*–64*c* will not cause failure of the overall circuit but will merely cause a drop in gain of about 2–3 db.

The gain of the amplifier 60 is given by Equation 6 previously set forth where *n* is the number of transistors 64 employed in the amplifier, $G_m$ is the transistor transconductance and $R_{02}$ is the lead resistance.

It is also well known that the input impedance, even if made purely resistive, of field effect transistors is extremely high. By connecting a plurality of such transistor devices in parallel the input impedance is greatly reduced, thereby further serving to simplify impedance matching between the amplifier 60 and the input and output circuits 62 and 69, respectively. The amplifier 60 completely avoids the need for dummy load matching impedances employed in the distributed amplifier input and output transmission lines. These dummy load matching impedances absorb half of the power developed by the amplifier circuit. Since such matching impedances are not employed in the amplifier circuit 60, half of the power developed is not lost in this circuit arrangement. In addition thereto, the amplifier circuit 60 does not require any transmission line circuits either of the distributed or lump-parameter type, which transmission lines, in conventional distributed amplifier, are complicated to design and match to one another.

The output load resistance of the load circuit 69 is limited by the practical transformer design at the operating frequencies. In the same manner the input source resistance is likewise limited by practical transformed design over the operating frequency band. The frequency response for the amplifier circuit 60 is limited by the device parameters plus transformers 61 and 68 and is not subjected to peaking of the response curve if properly designed. One suitable transformer means having a very flat broad band response characteristic will be more fully described.

Figure 7:
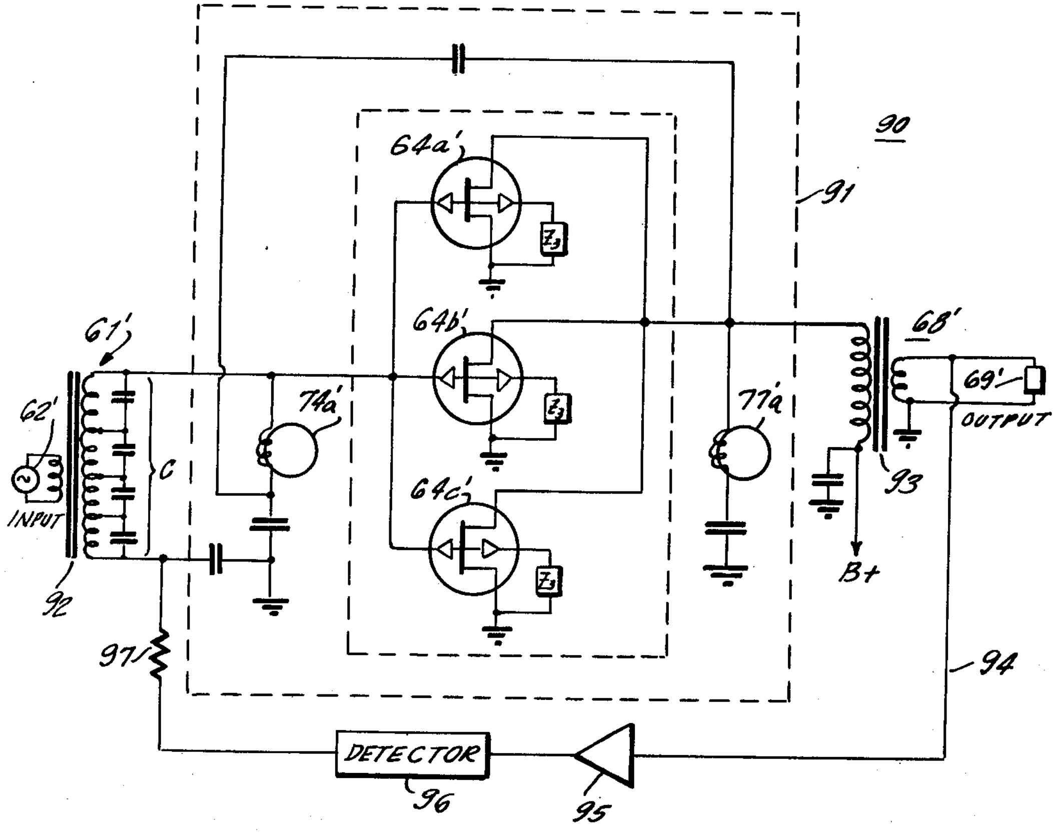

FIGURE 7 shows a modified redundant amplifier circuit 90 which may be employed as an alternative to the amplifier circuit 60 of FIGURE 6. All similar components between the circuits 60 and 90 are designated with like numerals which are primed.

The major distinction between the circuits 60 and 90 is that the field effect transistor devices 64*a′*–64*c′* are all connected in common but only a single inductance device 74*a′* is provided for the nullification of input capacity and only a single inductance device 77*a′* is provided for nullifying output capacity. The circuit 90 of FIGURE 7 operates in a manner substantially similar to that of the circuit 60 of FIGURE 6 by coupling the transistors 64*a′*–64*c′* in parallel in the manner shown. The parallel connected devices increase the circuit transconductance $G_m$.

The circuit 90 of FIGURE 7 may be modified by placing a greater or lesser number of transistor devices 64 in parallel with one another or as another alternative, a plurality of networks 91 may be coupled in parallel between the input and output transformers 61′ and 68′ to further increase circuit redundancy and circuit transconductance.

Figure 8:
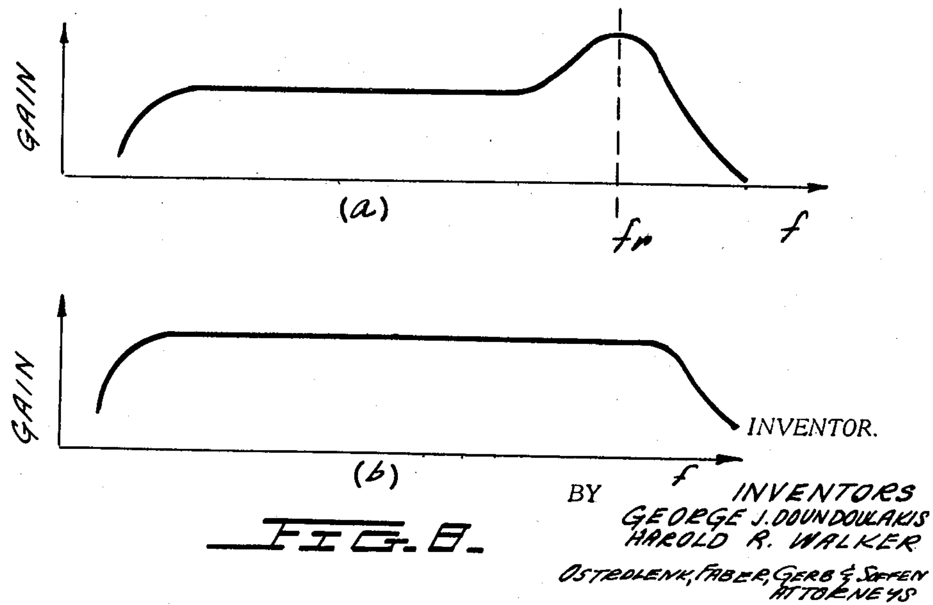
FIGURE 8 shows a pair of curves plotting gain versus frequency for the transformers of FIGURES 6 and 7.

As was previously described the circuits of 60 and 90 are limited in frequeny response only by device parameters and the input and output transformers 61 and 68. The transformer distributed capacitance C shown for the input transformer 61′ in FIGURE 7, causes the transformer to resonate at the upper frequency limit causing peaking of the frequency response curve *a* shown in FIGURE 8 at the resonant frequency $F_r$. It can clearly be seen that this frequency response curve causes the curve to lose its flatness over the operating frequency band. This effect may be avoided by employing a ferrite core 92 in the transformer which has a permeability which varies with frequency at its upper operating frequencies. This arrangement causes the resonance point to be continually moved outwardly along the frequency response curve so as to give very flat broad band response characteristic as shown by the curve *b*. Thus the use of such a variable permeability ferrite core 92 and 93 in both input and output transformers 61' and 68', respectively, greatly broadens the frequency response of the amplifier circuit 90. Use of such a ferrite core in the input and output transformers 61 and 68 of the amplifier circuit 60 will result in the same advantage.

The resistance R employed in the amplifier circuit 60 of FIGURE 6 is preferably of the order of 3–500 ohms for amplifier circuits designed for use in CATV applications. The resistor R serves the function of terminating the line properly to avoid signal reflections on the line from the input source 62. Since the output load may be assumed to be a perfect match, no standing waves will appear in the output circuit and hence no resistor need be employed across the primary of the output transformer 68. In the case where reflective waves are present in the output line, a resistance of the order of 6–800 ohms may be placed across the primary winding with a consequent loss of power.

If desired, an AGC circuit may be employed with the amplifier circuits 60 or 90 of FIGURES 6 or 7. For example, considering the circuit 90 of FIGURE 7, a portion of the output signals is fed through a coaxial line 94 into the input of amplifier 95. The output of amplifier 95 is passed to a detector circuit 96 which fullwave rectifies the amplified signal. This D.C. level is applied to one terminal of the secondary transformer 61' through a resistive element 97. The AGC circuit will automatically adjust the gain level of the amplifier circuit 90'. For example, if one of the transistors 64 fails, for any reason, the bias level of the circuit is automatically adjusted in order to provide substantially the same gain for the circuit with one of the transistors inoperative so as to maintain substantially the same gain as when the circuit 90 has all of its transistors operating.

From a consideration of Equation 6 it can be seen that the gain can be increased by increasing the characteristic impedance of the transmission line or load impedance. The use of input and output capacitances of the transistor (or tube) as the shunt capacitances of the distributed amplifier input and output transmission lines limits the value of the series inductance selected for the transmission line. From a consideration of the Equation 1 it can be seen that characteristic impedance increases for increasing values of inductance. However, from Equation 2 phase velocity decreases with increasing values of inductance, also resulting in lower cutoff frequency.

The characteristic impedance (and hence the gain) may be increased substantially by choosing the transmission line capacitance to be as small a value as possible. This is accomplished by replacing the input capacitance of the transistor (or tube) by a conventional capacitor having a very small value and nulling the input or output capacity of the device so that it represents a pure resistance.

Figure 5:
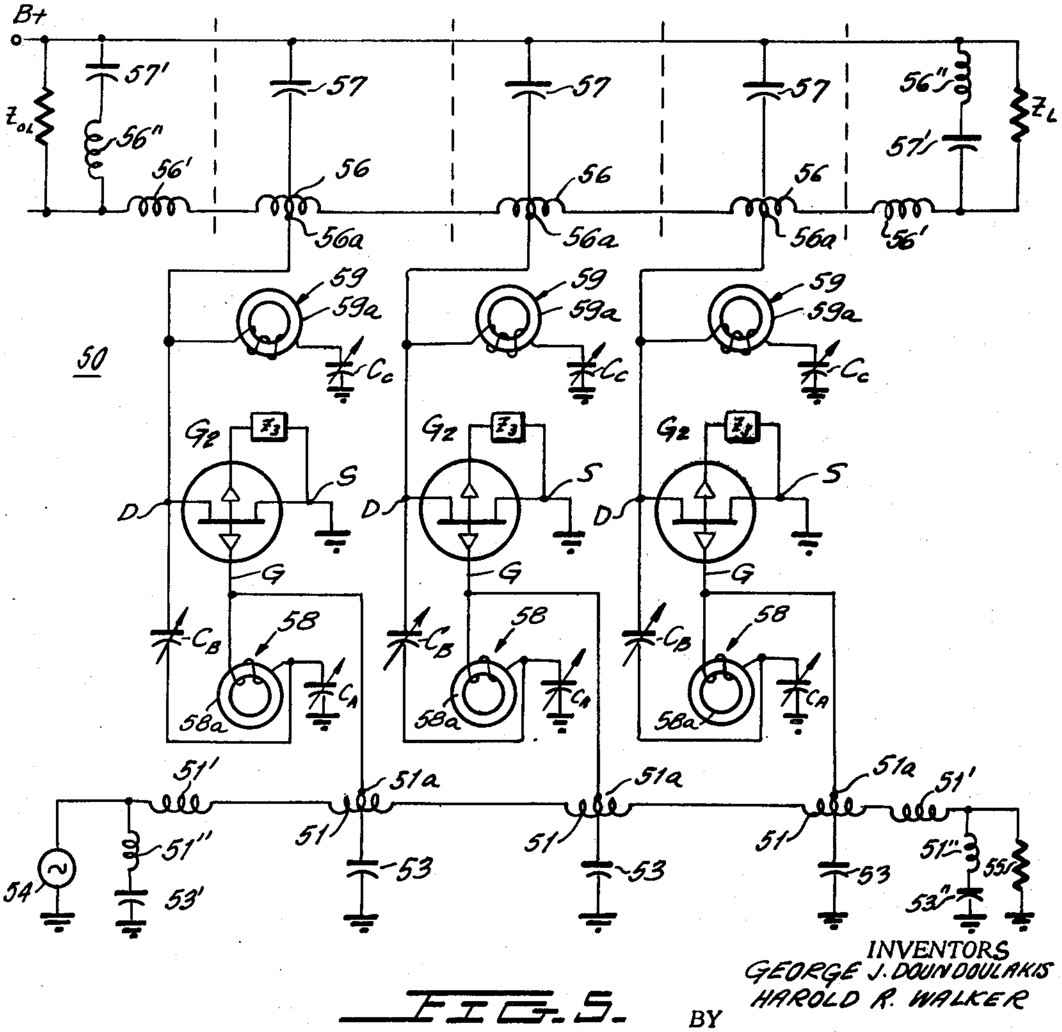
FIGURE 5 is a schematic drawing showing a distributed amplifier circuit employing novel impedance transforming elements.

FIGURE 5 shows a distributed amplifier circuit 50 having an input transmission line comprised of series inductors 51, and conventional shunt capacitors 53 coupled at the center taps 51*a* of the inductors 51. Input source 54 is coupled at one end of the line and a dummy load 55 is coupled to the opposite end of the line. The output transmission line is comprised of series inductors 56 and conventional shunt capacitors 57.

The center taps 51*a* of inductors 51 are coupled to the first gate $G_1$ of transistors T through an inductive device 58. Each inductive device is provided with a ferrite core 58*a* whose permeability varies according to the curve shown in FIGURE 3*c*. The drain electrode D of each transistor is coupled to an associated center tap 56*a* of inductors 56 through inductive device 59 each employing a ferrite core 59*a* similar to the ferrite cores 58*a*.

The input capacitance of each field effect transistor T forms a parallel resonant circuit with an associated inductor 58 and each output capacitance of the field effect transistors forms a second parallel resonant circuit with an associated inductor 59.

Figure 3A:
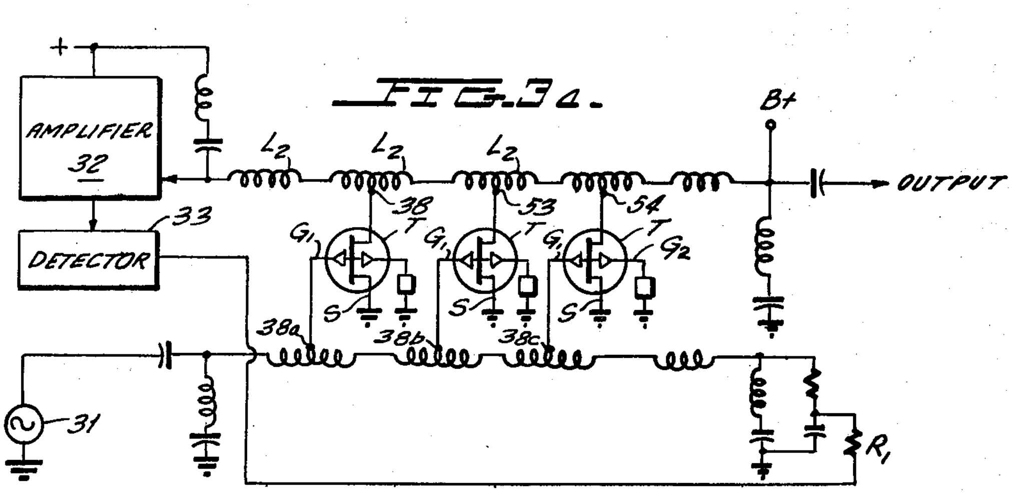
Figure 3C:
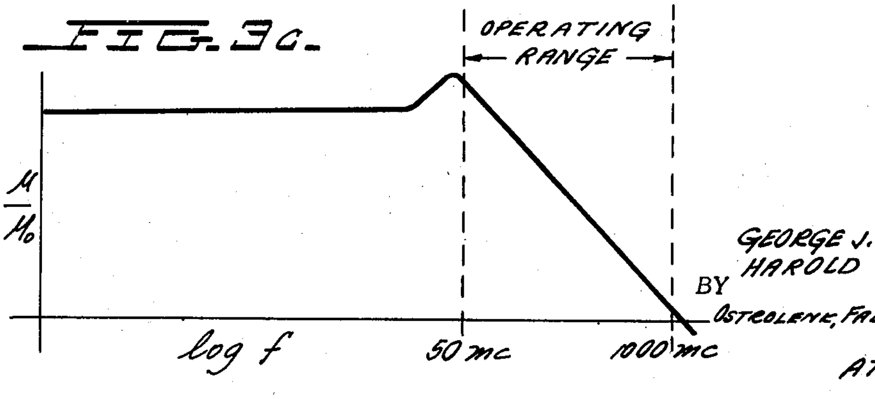
Figure 3B:
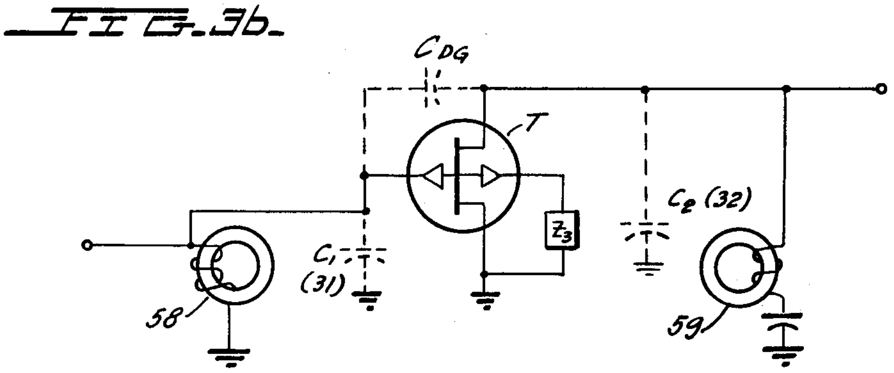

Reference will now be made to FIGURE 3*b* which shows one of the amplifying transistor devices T which is substantially identical to the devices T of FIGURE 5. As shown in FIGURE 3*b* the transistor input capacity is 31, the transistor output capacity is 32. Each of these capacities has an inductive device 58 and 59 respectively, coupled in parallel therewith to form a parallel resonant circuit.

It is well known that tuned circuits have a single resonant frequency $f$ which is given by $$f=\frac{1}{2\pi\sqrt{LC}} \qquad (8)$$

Such tuned circuits have only one resonant frequency. At resonance the parallel tuned circuit is purely resistive so that its input impedance Z is given by $$Z=R \qquad (9)$$

where R is equal to the resistance of the parallel tuned circuit. By providing an impedance device whose value varies inversely with frequency it is possible to provide a parallel resonant circuit which is in resonance at every frequency over the entire operating frequency band. If the impedance device can be made to change its value inversely with the square of the frequency its impedance will be purely resistive over the entire operating frequency band.

This result is achieved by providing the inductive devices 58 and 59 which have ferromagnetic cores 58*a* and 59*a* of a permeability which varies in magnitude in accordance with the curve shown in FIGURE 3*c*. The plot in FIGURE 3*c* represents the normalized permeability $\mu$, i.e., $\mu/\mu o$, plotted against the log of frequency (log $f$). As shown in the plot of FIGURE 3*b* for materials such as those manufactured by Indiana General Corporation and identified as types Q–1, H–1, R–6 and *R*–5, $\mu/\mu o$ varies linearly in the frequency range from 50–1000 megacycles. These ferrites have advantageous applications in the television field in which it is desired to amplify signals at frequencies as high as 250 megacycles. The use of such a ferrite core 58*a* or 59*a* in the inductive devices 58 and 59 transforms the transistor input and output impedance into pure resistance thereby effectively nullifying device input and output capacity at all frequencies and transforming device input and output impedance into pure resistance.

Due to the conversion of the input and output impedance of each transistor T into pure resistance the input and output transmission lines can now employ conventional capacitors 53 and 57, the values of which may be freely selected totally independent of the device input and output capacities. The capacity values of the elements 53 and 57 are preferably chosen to be quite small in order to achieve a line characteristic impedance $Z_o$ which is quite high. The effect of the amplifier devices T on the input and output transmission lines is to provide resistive loading only. Since this load is no greater than the device impedance itself and in fact usually is the real part of the device impedance, this loading can be taken into consideration in designing a line by means of formulas found in the literature. For example, see the article entitled Distributed Amplification by Gintzon, Hewlitt, Jasperg and Noe, appearing in the proceedings of the IRE August 1948 and particularly appearing on page 963 of this publication. Thus the inductive devices 58 and 59 form parallel resonant circuits with the device input and output capacities causing the input and output transmission lines of the distributed amplifier circuit 50 of FIGURE 5 to be totally unaffected by transistor input and output capacity.

The inductive devices 58 and 59 also have other virtues. As shown in FIGURE 4*b* the inductive, capacitive and resistive components $L_n$, $C_n$ and $R_n$ respectively, are employed for providing neutralization for the transistor, but act to significantly reduce gain in distributed amplifier circuits. The use of the variable L inductance devices permit the design of neutralized amplifier circuits in which the gain is not significantly reduced.

The technique for neutralizing an amplifier device can best be appreciated from a description of the capacitance bridge-type circuits 100 and 110, shown in FIGURES 9*a* and 9*b*, respectively. For example, considering FIGURE 9*a*, there is shown therein an amplifying device such as a triode 111 (for example) having an anode to grid capacitance $C_c$ and an input capacitance $C_1$. The adjustable capacitance $C_n$ is employed as the neutralizing capacitance. In order to neutralize the circuit 100 of FIGURE 9*a* a signal generator 102 is coupled across the output of the circuit and the neutralizing capacitance $C_n$ is adjusted until no signal $E_n$ appears across the amplifier input terminals.

The variable inductance L employing a variable permeability ferrite core 103 of the same type as previously described is tuned through the use of the adjustable capacitance $C_f$ coupled between one terminal of inductance device L and ground.

For capacitance bridge-type circuits it is known that $$C_n=\left(\frac{Cf}{C_1}\right)C_c \qquad (10)$$

The operating frequency range of the amplifier circuit 100 is much higher than the resonant frequency of inductance device L and capacitance $C_f$ such that $$f_0 \gg \frac{1}{2\pi\sqrt{LC_f}} \qquad (11)$$

From the Equations 10 and 11 and due to the fact that the inductance device L varies inversely with the square of the frequency, the capacitance $C_f$ need be only about twice as large as the input capacity $C_1$. Thus, from Equation 10 $C_n$ is equal to $2C_c$. Having selected the general range of the capacitor $C_f$ and after having adjusted the neutralizing capacitor $C_n$ the capacitor $C_f$ is then adjusted so that the input capacity of the amplifying device, i.e., triode 101 is fully neutralized by the presence of the inductance device L. Thus the single inductance device L not only neutralizes the tube input capacity but neutralizes the resultant input capacity of the entire device taking into account the presence of adjustable capacitors $C_n$ and $C_f$.

Turning to a consideration of the circuit 110 of FIGURE 9*b*, the inductance device $L_1$ may be tuned in a similar manner so as to nullify all device output capacity by adjusting the capacitor $C_f'$ so that all device output capacity is nullified. This adjustment should be made after the neutralizing capacitor $C_n$ has been adjusted in the manner previously described. Since the neutralizing capacity raises the output capacity of the device, the output inductive device $L_1$ must be designed with the increased output capacitance being taken into account.

FIGURE 5 thus shows the resulting distributed amplifier circuit design in which input and output transmission lines have high characteristic impedance; the transistor devices T have input and output impedances which are purely resistive and the transistors T are fully neutralized. The circuit design of FIGURE 5 yields superior gain over conventional circuits while functioning over an extremely broad band of frequencies. The value of the neutralizing and tuning capacitances $C_A$–$C_A''$, $C_B$–$C_B''$ and $C_C$–$C_C''$ are preferably chosen so that C–$C_A''$ equals $2C_1$; $C_C''$ is equal to $2C_2$; and $C_B$–$C_B''$ is equal to $2C_{DG}$ where $C_1$, $C_2$ and $C_{DG}$ are shown in FIGURE 3*a*.

It can therefore be seen from the foregoing description that the instant invention provides a distributed amplifier circuit which has vastly improved gain and frequency response characteristics when compared with the conventional techniques, and further, which eliminates interaction between transistor (or tube stages), greatly simplifies impedance matching and avoids energy loss in the matched dummy load impedances.

Although there has been described a preferred embodiment of this novel invention, many variations and modifications will now be apparent to those skilled in the art. Therefore, this invention is to be limited, not by the specific disclosure herein but only by the appending claims.

What is claimed is:

1. A distributed amplifier circuit comprising:
an input transmission line;
an output transmission line having a phase velocity substantially equal to the phase velocity of said input transmission line;
a plurality of first amplifying means each having an input and an output terminal;
each of said input terminals being coupled at spaced intervals along said input transmission line;
each of said output terminals being coupled at spaced intervals along said output transmission line;
the internal capacitances of said amplifier devices being employed as the shunt capacitances for said input and output transmission lines;
one end of said input transmission line being coupled to an energy source;
first dummy load impedance means;
the opposite end of said input transmission line being coupled to said first dummy load impedance means for preventing standing waves in said input transmission line;
one end of said output transmission line being coupled to an output load circuit;
solid state amplifying means having an input and an output;
the opposite end of said output transmission line being coupled to the input of said solid state amplifying means;
the impedance of said solid state amplifying means preventing standing waves in said output transmission line;
detector means coupled between the output of said solid state amplifying means and said first dummy load impedance means applying a rectified signal upon said first dummy load impedance means for automatically adjusting the gain of each of said first amplifying means.
varies inversely with frequency.

2. The distributed amplifier of claim 1 wherein the input and output transmission lines are comprised of a plurality of constant Kπ filter sections.

3. The distributed amplifier of claim 1 wherein the input and output transmission lines are comprised of a plurality of m-derived π filter sections.

4. A distributed amplifier circuit comprising:
an input source and a load circuit;
an input transmission line having a first end coupled to said input source;
an output transmission line having a first end coupled to said load circuit;
a plurality of amplifying devices each having an input and an output;
the inputs of each of said amplifying device being coupled to points arranged at spaced intervals along said input transmission line;
impedance means each being coupled to an amplifying device to form a parallel resonance circuit with the impedance of said amplifying device appearing across the input;
said impedance means including means for neutralizing the input impedance of said amplifying device to create an effective impedance looking into the input which is substantially pure resistance over substantially the entire operating frequency band of said distributed amplifier circuit;
an output transmission line;
each of said amplifying device outputs being coupled at spaced intervals along said output transmission line;

the phase velocity of said input and output transmission lines being subsantially equal;

said impedance means each being comprised of inductances having ferrite cores having a permeability characteristic which varies inversely with frequency to effectively isolate the input capacity of said amplifying devices from said input transmission lines.

5. An amplifier circuit coupling an input source to a load circuit comprising;

a plurality of amplifying devices each having an input and an output;

first transformer means having an input coupled to the input source and an output coupled in common to the inputs of all of said amplifying devices;

second transformer means having an output coupled to the load circuit and an input coupled in common to the outputs of all of said amplifying devices;

single impedance means being coupled across the inputs of all of said amplifying devices for neutralizing the input impedance looking into the inputs of each of said amplifying devices so as to create an input impedance which is substantially pure resistance over the entire operating frequency band of the amplifier circuit;

second single impedance means coupled to the outputs of all of said amplifying devices to form a parallel resonance circuit with the amplifying device output impedances;

said second impedance means including means for neutralizing the output impedance of said amplifying devices so as to create an output impedance which is substantially pure resistance over substantially the entire operating frequency band of distributed amplifier circuit;

each of said single impedance means being comprised of an inductor having a ferrite core, each of said ferrite cores having a permeability characteristic which

References Cited

UNITED STATES PATENTS

| | | | |
|---|---|---|---|
| 1,801,870 | 4/1931 | Little | 330—124 |
| 2,205,075 | 6/1940 | Wilhelm | 330—154 X |
| 2,863,006 | 12/1958 | Diambra et al. | 330—54 |
| 2,978,579 | 4/1961 | Sosin | 330—54 X |
| 3,097,343 | 7/1963 | Sosin et al. | 330—54 X |
| 3,222,611 | 12/1965 | Norton | 330—54 |

FOREIGN PATENTS

| | | |
|---|---|---|
| 247,626 | 3/1963 | Australia. |

NATHAN KAUFMAN, Primary Examiner

U.S. Cl. X.R.

330—38